United States Patent
Markey

[15] 3,660,693
[45] May 2, 1972

[54] ANALOG TENS AND UNITS TIMER WITH SOURCE SYNCHRONIZATION

[72] Inventor: James F. Markey, Detroit, Mich.
[73] Assignee: Weltronic Company, Southfield, Mich.
[22] Filed: Oct. 1, 1970
[21] Appl. No.: 77,234

[52] U.S. Cl. .......................... 307/293, 219/114, 307/269, 307/283, 328/72, 328/74, 328/130
[51] Int. Cl. .......................................... H03k 17/28
[58] Field of Search ................ 219/114, 115; 307/269, 283, 307/293, 294; 328/72, 74, 129, 130

[56] References Cited

UNITED STATES PATENTS

| | | | |
|---|---|---|---|
| 3,183,372 | 5/1965 | Chin | 328/74 X |
| 3,388,346 | 6/1968 | Roof et al. | 307/293 X |
| 3,259,854 | 7/1966 | Marcus et al. | 307/283 X |
| 3,267,382 | 8/1966 | Adem | 328/72 |
| 3,346,716 | 10/1967 | Broomhall | 219/114 X |
| 3,397,323 | 8/1968 | Hirsch | 307/293 X |
| 3,493,715 | 2/1970 | Bigowsky et al. | 219/114 |
| 3,526,742 | 9/1970 | Hill | 219/114 |

OTHER PUBLICATIONS

Greenberg; " Pulse Operated Time Delay Relay," RCA Technical Notes No. 409, January 1961

*Primary Examiner*—Donald D. Forrer
*Assistant Examiner*—R. C. Woodbridge
*Attorney*—Harness, Dickey & Pierce

[57] ABSTRACT

A timing system for use in conjunction with a welding system, wherein the timing system consisting of separate tens and units counters, the counters being electronically controlled to select the tens counter prior to the selection of the units counter. A system is provided for generating synchronizing pulses and a bistable circuit, in the form of a flip flop, is utilized to switch from the tens counter to the units counter upon completion of the tens count.

18 Claims, 2 Drawing Figures

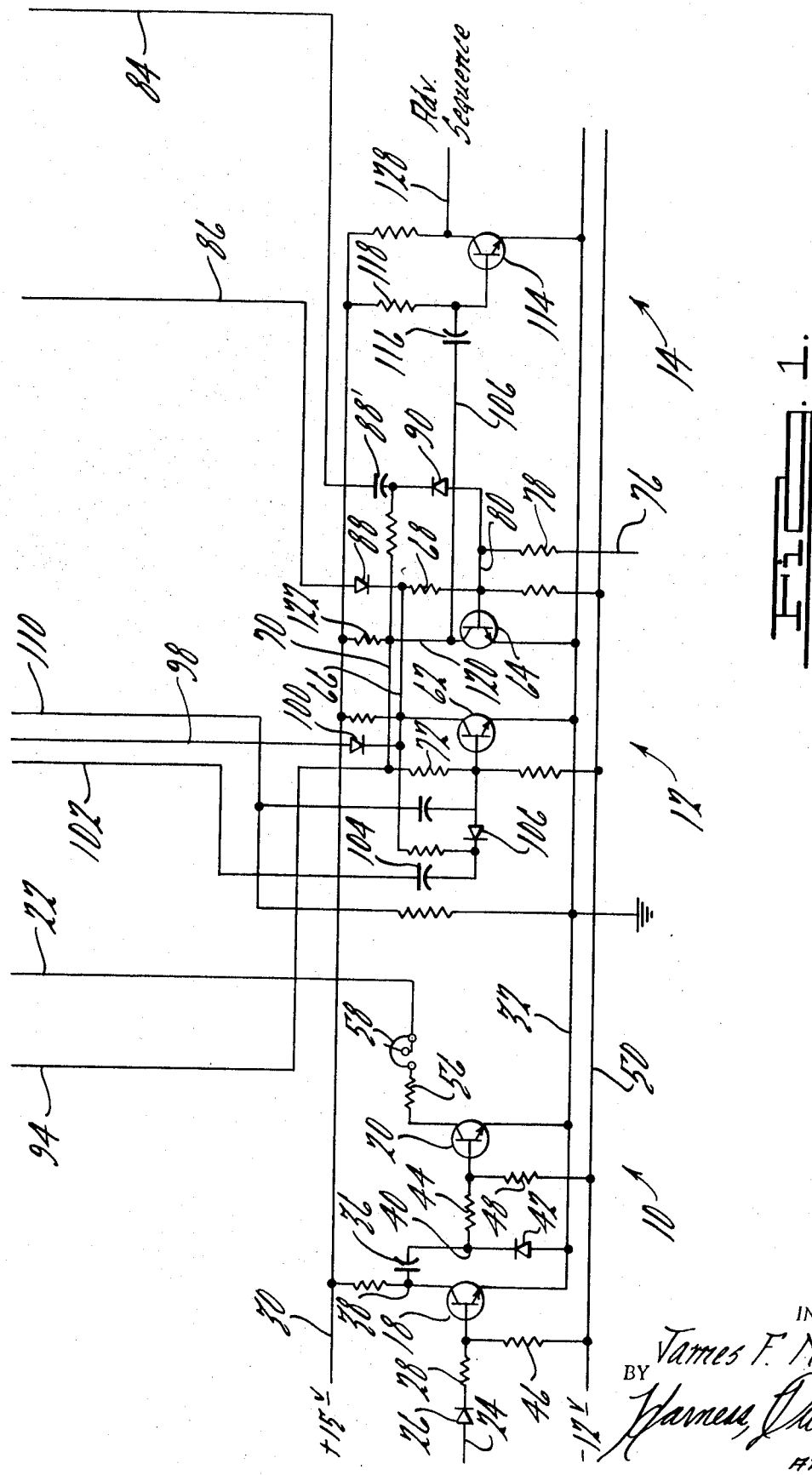

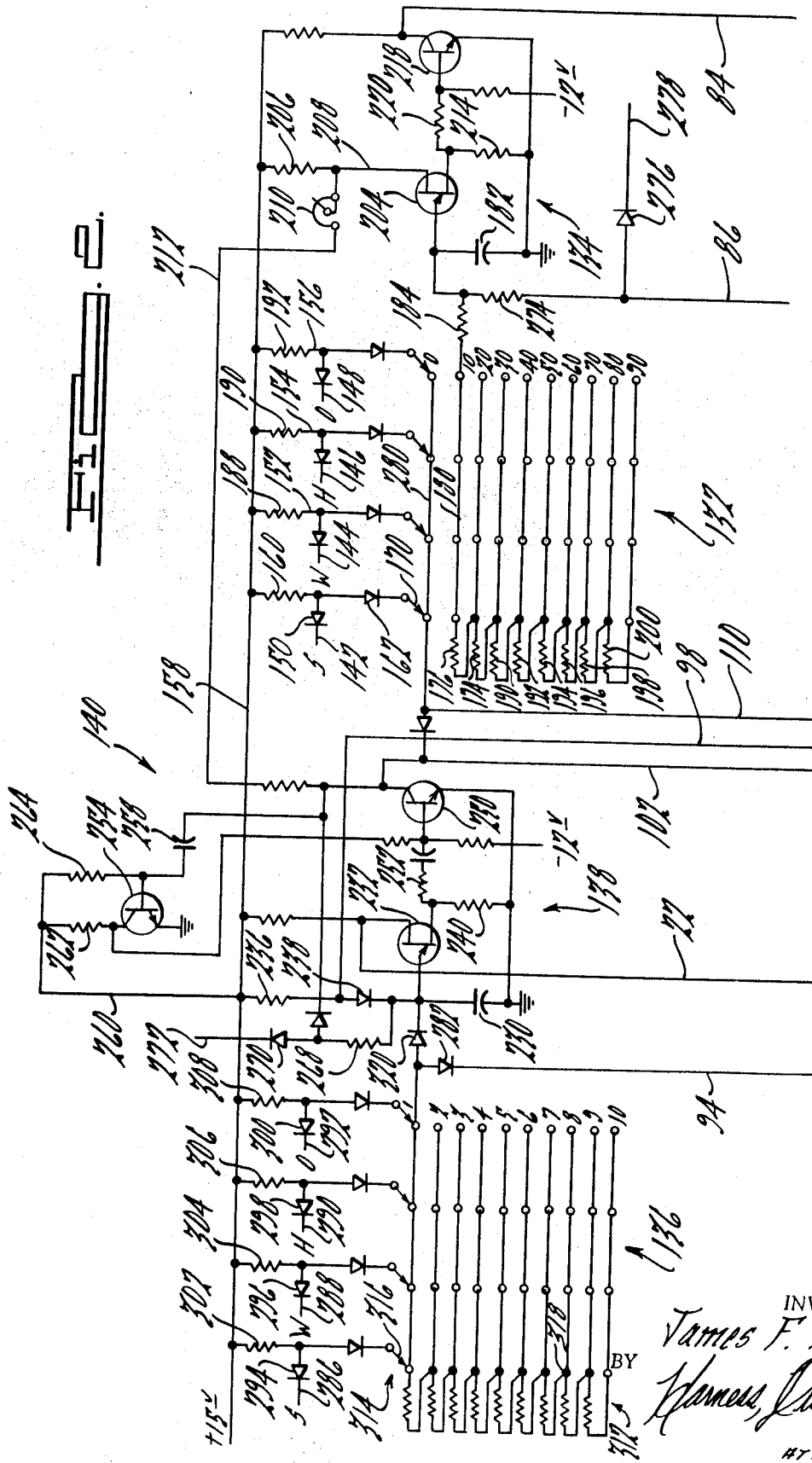

ANALOG TENS AND UNITS TIMER WITH SOURCE SYNCHRONIZATION

The purpose of the foregoing abstract is to enable the Patent Office and the public generally, and especially the scientists, engineers or practitioners in the art who are not familiar with patent or legal terms or phraseology to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE DISCLOSURE

This invention relates generally to a timing system and more particularly to a timing system for use in connection with automatically timing discrete portions of a welding cycle utilizing electronic element control of the timer.

In certain applications in the welding art, a need has arisen for a highly accurate and highly reliable timer. While prior systems have provided the reliability required, the combination of reliability and extreme accuracy has not been easily obtainable. With the system of the present invention, the aforementioned need has been met with a system for controlling each of the phases of a welding cycle, as for example squeeze, weld, hold and off.

The system of the present invention contemplates providing a separate tens counter and a separate units counter, the system counting the tens portion first and completing the count by counting the units portion subsequently. A solid state bistable circuit has been provided to switch back and forth between the tens and units counter, in accordance with the needs of the count to be achieved, and also senses the condition where only a units count has been selected without entering into the tens count area. Further, the system includes a synchronizing circuit which synchronizes the output pulses from the counters to the line frequency. Also, circuitry has been provided to insure that the counter starts at a zero count and that the bistable switching circuit starts in the proper state.

Accordingly, it is one object of the present invention to provide an improved timing circuit.

It is another object of the present invention to provide an improved timing circuit which is extremely accurate and highly reliable.

It is still another object of the present invention to provide an improved counting circuit which incorporates separate tens and units counters and utilizes a bistable switching circuit to select the tens counter in the case where a count is desired higher than a preselected minimum count.

It is still a further object of the present invention to provide an improved synchronizing circuit for insuring that the output count occurs at a preselected portion of a selected wave form.

It is still a further object of the present invention to provide an improved timing circuit which minimizes the malfunctioning of various electronic components utilized in the system.

It is still a further object of the present invention to provide an improved switching circuit for a timing system of the type described.

It is a further object of the present invention to provide an improved self-compensating output circuit for an electronic timer.

It is still another object of the present invention to provide an improved system for resetting a timing circuit of the type described.

Further objects, features and advantages of this invention will become apparent from a consideration of the following description, the appended claims and the accompanying drawings in which:

FIG. 1 is a schematic diagram of a portion of a preferred system incorporating certain features of the present invention; and FIG. 2 is a schematic diagram illustrating the remaining portion of the preferred embodiment of the present invention.

Referring now to FIG. 1, there is illustrated an input pulse generating synchronizing circuit 10 which is utilized to generate synchronizing pulses for the timing circuit, to be discussed in conjunction with FIG. 2, a bistable flip flop circuit 12 which is utilized to control the switching from the tens to the units counting circuits and an output pulsing circuit 14 which is utilized to advance the sequence of the welding cycle.

Referring specifically to the pulse generating circuit 10, it is seen that the circuit includes a pair of amplifying transistors 18, 20, the transistor 20 providing an output pulse on an output conductor 22 to synchronize the operation of the circuit to be described in FIG. 2. The base electrode of the transistor 18 is connected to an input conductor 24 through a diode 26 and a resistor 28, the conductor 24 being connected to a source of 24 volts of alternating current. The alternating current supplied to the transistor 18 causes the voltage at the collector electrode to be switched between approximately 15 volts connected to conductor 30 and ground potential connected to a conductor 32. This, of course, is due to the fact that the input alternating voltage causes transistor 18 to switch from the conductive state during the positive half wave to the non-conductive state when the input voltage and current falls below that required to maintain the conduction of transistor 18.

The collector electrode of transistor 18 is connected to a capacitor 36, the capacitor 36 differentiating the square waves occurring at node 38 to provide a positive and negative going spike at node 40. The negative going spike is grounded through a diode 42 and the positive going spike is fed to the base electrode of transistor 20 through a resistor 44. The necessary bias for transistors 18 and 20 is provided by base electrode resistors 46, 48 connected at one end to the respective base electrodes of the transistors 18 and 20 and at the other end to a negative 12 volt direct current potential at conductor 50.

The positive going spikes are fed to the transistor 20 to switch the transistor 20 from the non-conductive state to the conductive state. The spikes are of sufficient magnitude to saturate the transistor 20 during the period that the transistor is conductive. The conduction of transistor 20 switches the collector voltage from a positive level to approximately ground potential due to the connection of the emitter electrode to the ground conductor 32 and the low drop across the collector-emitter path. This pulse occurs at the leading edge of the positive pulse generated by transistor 18 and is fed to the output conductor 22 through a fixed resistor 56 and a variable potentiometer 58. The potentiometer varies the characteristic of the pulse being fed to conductor 22 such that the units counter circuit (to be described) will produce an output pulse at the selected count as will be seen from a further explanation of FIG. 2.

Referring now to the flip flop circuit 12, it is seen that the bistable circuit 12 includes a pair of transistors 62, 64 which are connected in the conventional cross coupled flip flop circuit. Particularly, the collector electrode of transistor 62 is connected, by means of a conductor 66 and a resistor 68, to the base electrode of the transistor 64 and the collector electrode of the transistor 64 is connected, by means of a conductor 70 and a resistor 72, to the base electrode of transistor 62. Thus, if an input pulse is supplied to one of the transistors, for example to the base electrode of transistor 64 by means of a conductor 76, a resistor 78 and a conductor 80, the pulse (in this case a positive pulse) will cause transistor 64 to conduct which will, in turn, cause transistor 62 to become non-conductive. The pulse supplied to conductor 76 is a positive pulse and utilized to reset the system initially and the resetting pulse causes transistor 64 to conduct.

In the operation of the system of the present invention, the transistor 64 is initially turned on by means of a pulse on conductor 76 and the transistor 62 is rendered non-conductive. This occurs during the time that the system is to initiate the count of the tens portion of the count. As will be seen from a description of FIG. 2, when the tens count is complete, a conductor 84 is grounded to thus ground the base electrode of the transistor 64 and turn the transistor 64 off. However, the fact of turning the transistor 64 on causes transistor 62 to become non-conductive to present a high voltage signal to conductor 66 to back bias a diode 88, thus permitting the operation of the tens counter.

When the units count is to be initiated, the transistor 64 is turned off because of the ground signal on conductor 84, which signal is fed to the base electrode thereof through a capacitor 88' and a diode 90, and the transistor 62 is rendered conductive. The conduction of transistor 62 grounds the conductor 86, through conductor 66 and diode 88, to disable the tens counter and a high positive signal is placed on a conductor 94 because of the high collector electrode voltage of transistor 64, the connection being through the conductor 70. It will be remembered that the transistor 64 is non-conductive during the units count. It will also be noted that the conductor 94 was previously grounded by virtue of the conduction of transistor 64, thus disabling the operation of the units counter.

Because of the state of the flip flop 12, a conductor 98 is provided with a high positive signal during the tens count and is grounded through the conduction of transistor 62 and the connection of a diode 100 during the units count. Upon the completion of the units count, a completion signal is impressed on a conductor 102 which is connected to the base electrode of transistor 62 through a capacitor 104 and a diode 106. The signal on conductor 102 is at ground potential at the termination of the units count which grounds the base electrode of transistor 62 and causes the transistor 62 to become non-conductive. The cross coupling network will then cause transistor 64 to be rendered conductive to provide an output signal on an output conductor 106.

In the event that there is to be a total count for a particular cycle of less than 10, a positive signal is impressed on a conductor 110 to cause the transistor 62 to switch to the opposite or conductive state and thus start the units count. As was the case above, the transistor 64 will be switched to the non-conductive state in response to the high positive signal.

Referring now to the signal on the output conductor 106, initially the transistor 64 is rendered conductive to ground the conductor 106 and the conductor 106 is subsequently raised to a positive voltage during the tens count due to the non-conduction of transistor 64. However, when the final count is achieved on the units counter and an output signal is impressed on conductor 102 to switch the state of the transistor 62, the signal level on conductor 106 will go to ground potential. This signal is fed to the base electrode of an output transistor 114 through a capacitor 116. It should be noted that the capacitor 116 is connected to the positive 15 volt potential on conductor 30 through a resistor 118 and is connected to the same 15 volt potential of conductor 30 through a conductor 120 and a resistor 122 during the period that the transistor 64 is non-conductive. Thus, through the action of capacitor 116, the transistor 114 is rendered conductive during the reset period and the period that the system is counting the tens and units. However, when the transistor 64 is switched to the final conductive state to indicate the end of the units count, the transistor 114 is rendered non-conductive to provide a positive pulse at an output conductor 128 connected to the collector electrode of transistor 114. This pulse is utilized to advance the sequence of the welding system from, for example, squeeze to weld, or weld to hold, or hold to off. For a preferred form of sequencer circuit which may be utilized, the disclosure of application Ser. No. 58,126, filed July 24, 1970 is incorporated herein by reference.

Referring now to FIG. 2, there is illustrated a tens counter 132 with its associated output circuit 134, a units counter circuit 136 with its associated output circuit 138 and a single-shot multi-vibrator circuit 140 which is utilized to generate the flip flop switching pulse on conductor 102.

Referring particularly to the tens counter circuit, the circuit includes a plurality of input terminals 142 to 148 corresponding to the squeeze, weld, hold and off functions respectively. When the squeeze function is to be selected, the input terminal 142 is provided with a positive signal sufficient to back bias input diode 150 and the remaining terminals 144, 146 and 148 are grounded to ground the conductors 152, 154, 156 for the non-selected functions. Upon applying the positive pulse to conductor 142, current is permitted to flow from a main conductor 158 connected to a positive source of 15 volt potential through a resistor 160 and a diode 162. Assume, for purposes of illustration, that a count of 38 pulses has been selected for the squeeze portion of the cycle. Accordingly, a switch armature 170 is moved downwardly to engage a 30 count contact 172. Thus, current will flow from conductor 158 through resistor 160, diode 162, armature 170, terminal 172 and a thirties resistor 174 and a twenties resistor 176. It will be noted that the resistor 160 provides the resistance for a tens count. Current then flows through a common conductor 180 to charge a capacitor 182 through a resistor 184. Current will not flow in any of the other circuits corresponding to the weld, hold or off portions of the cycle due to the fact that the lower end of the resistors 188, 190, 192 are grounded by appropriate signals being impressed on conductors 144, 146 and 148.

Thus, the current flowing through the resistor 184 will cause capacitor 182 to charge in accordance with the amount of resistance connected in series between the capacitor and the source of potential at conductor 158. In the case of a thirties count, the resistance will include a resistor 160, a resistor 174, a resistor 176 and a resistor 184. The circuit is also provided with a fourties through nineties resistor 190 through 200, respectively.

The charge on capacitor 182 is a direct function of the amount of resistance in series with the capacitor, and thus the number of tens pulses to be counted. It is the charge on capacitor 182 that is utilized to break over a unijunction transistor 204, the emitter of which is connected to the capacitor 182. However, the base voltage of the unijunction transistor 204, as supplied by resistor 206 connected to conductor 158 and a conductor 208 is insufficient to permit the breaking over of the unijunction transistor in response to the voltage impressed on capacitor 182. However, the system further includes a variable potentiometer 210 which is connected to the single-shot multi-vibrator circuit 140 by means of a conductor 212.

When the system is in the tens portion of the count, a pulse is impressed on conductor 212, which goes from a high positive potential down to a lower potential, near zero. Thus, the voltage at the base electrode, connected to the conductor 208, is caused to be sufficiently low to permit the charge on capacitor 182 to break over the unijunction transistor 204 at the selected count. The potentiometer 210 is adjusted to adjust the voltage being fed to the base electrode and it is to be noted that the charge on capacitor 182 necessary to break over the unijunction transistor 204 is the same for all counts. It is merely a matter of the length of time it takes the capacitor 182 to achieve that charge as varied by the increased resistance supplied in series with the capacitor in response to a higher selected count.

When the selected count has been reached and the unijunction transistor 204 has been broken over, current will flow from the base one - base two circuit, through a resistor 214, to provide a positive pulse to the base electrode of an output transistor 218, through a resistor 220. This pulse causes transistor 218 to switch from the normally non-conductive state to conductive state thereby dropping the potential on conductor 84 from a positive to a relatively low potential near ground. This pulse is utilized to switch the states of the flip flop circuit 12 described in conjunction with FIG. 1.

Referring now to the units circuit 138, and particularly to the pulse generated on conductor 112 in response to the sensing of 10 input pulses, it is seen that the circuit 138 includes a capacitor 230 which is connected to the emitter electrode of an output unijunction transistor 232. During the period that the system is in the tens count, the conductor 94 is grounded to ground, or disable, the units counter 136. A synchronizing pulse is impressed on conductor 22, connected to the base electrode of the unijunction transistor 232, to provide synchronizing pulses for the transistor 232. Also, the conductor 98 is not grounded during the tens count thereby permitting current to flow from the conductor 158 to the capacitor 230, through a resistor 236 and a diode 238.

The resistor 236 is selected to have a resistance which, in combination with the impedance of the capacitor 230, will provide a timing cycle of exactly 10 pulses. Thus, for each 10 pulses impressed on conductor 22, the capacitor 230 will have achieved a sufficient charge to break over unijunction transistor 232 at the time that the 10th synchronizing pulse is impressed on conductor 22.

Thus, the unijunction transistor 232 will conduct and provide current flow through a resistor 240. This provides a positive potential which is fed to a normally non-conductive transistor 250 through a resistor 252. The resistor 250 forms half of a single-shot multi-vibrator circuit, the other half being formed by a normally conductive transistor 254. The collector electrode of transistor 250 is connected to the base electrode of transistor 254 by means of a capacitor 258, as is conventional in the art. It will be noted that the collector electrode of transistor 254 is connected to the positive source of 15 volt potential by means of a conductor 260 and a resistor 262. The base bias for the transistor 254 is supplied by a resistor 264 and the capacitor 258, as is conventional in the art. When the transistor 250 is rendered conductive, the synchronizing pulse is placed on conductor 212 as described above.

However, during the units count, the conductor 98 is grounded, thereby grounding the lower end of resistor 236 and removing the resistor 236 from circuit with capacitor 230. Also, a reset circuit, including a resistor 268 and diode 270 connected to an input terminal 272, is provided to insure that the capacitor 230 is discharged initially. Thus, a ground signal is impressed on conductor 272. A similar provision has been made for the tens capacitor 182 by means of a resistor 274, a diode 276 and a conductor 278. A ground signal impressed on conductor 278 will insure that capacitor 182 is initially discharged.

It will be noted that the transistor 250 is also utilized as the output transistor to provide the switching pulse on conductor 102. However, during the tens count, the transistor 62 was non-conductive and grounding conductor 102 will not affect this condition. However, in the case where the units count is being completed, the grounding of conductor 102 will cause previously conductive transistor 62 to become non-conductive. Also, it will be noted that conductor 110 is connected to a common line 280 which is in actuality the zero tens count for the tens counter circuit 132. Thus, if any particular portion of the welding cycle provides for a zero tens count, a pulse will immediately be placed on conductor 110 to switch the flip flop circuit 12 to the units counting state thereby enabling the units counter circuit 136. The enabling of units counter circuit 136 occurs when a positive signal is impressed on conductor 94 to back bias a diode 282.

It will be noted that the units counter circuit 136 is substantially identical to that described in conjunction with the tens counter circuit 132. Accordingly, a plurality of input terminals 286, 288, 290, 292 are provided and correspond to the squeeze, weld, hold and off portions of the cycle, respectively. The conductors are connected to individual diodes 294 to 300 which in turn are connected to the conductor 158 through resistors 302, 304, 306 and 308. Thus, when any one of the conductors 286, 288, 290, 292 is supplied with a positive potential, the respective diode 294 to 300 will be back biased to permit current to flow through the corresponding transistor 302 to 308. The remaining diodes, of course, are grounded through their respective conductors.

The units counter includes a plurality of resistors 312 connected in identical manner to those described in conjunction with circuit 132 and the squeeze, weld, hold and off portion circuits include a plurality of individual armatures 314 which may be moved to the respective terminals corresponding to the desired count. In the previous example, the squeeze portion of the cycle was stated to be 38 pulses. Accordingly, an armature 316 would be moved to the eighth terminal 318 so that current, during the squeeze portion of the cycle, would flow through resistor 302, terminal 316, terminal 318 and all the resistors connected between terminal 318 and capacitor 230.

This current will then flow to the capacitor 230 by means of a diode 320 to charge the capacitor to a preselected voltage, the time required to reach that voltage being determined by the number of resistors connected in series circuit with the capacitor 230. When the proper voltage has been reached on capacitor 230 and a synchronizing pulse is impressed on conductor 22, the unijunction transistor 232 will break down to cause transistor 250 to conduct.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An analog, line synchronized timing system for timing preselected periods of time for a plurality of events including a source of pulsating voltage, the system comprising first and second analog timers interconnected to sequentially time units and tens portion and subsequently selecting said units portion, and circuit means for synchronizing the completion of the units count with a characteristic of the source voltage.

2. The system of claim 1 wherein said pulsating voltage is a sinusoidal, alternating current signal.

3. The system of claim 1 wherein said synchronizing circuit means includes pulse generating circuit means connected to said source of pulsating voltage.

4. The system of claim 3 wherein said pulse generating means generates an output spike pulse in response to the sensing of substantially the start of a half wave of said pulsating source.

5. The system of claim 4 wherein the units counter includes a controllable semiconductor output device and a timing circuit, the timing circuit means and the synchronizing circuit providing output signals which coincide at a point in time to signal the completion of the units count.

6. The system of claim 5 wherein said units analog timer provides an increasing timing voltage in response to the passage of time.

7. The system of claim 6 wherein said controllable device has at least two electrodes, said units timer being connected to one electrode and said synchronizing circuit means being connected to the other electrode.

8. The system of claim 7 wherein said controllable device achieves a conductive state when the relative voltage between the said at least two electrodes achieves a preselected relation.

9. The system of claim 8 wherein said relationship of voltages occurs at the preselected units time and at the characteristic of the source of voltage occurring after the preselected units time.

10. The system of claim 9 wherein said pulse generating means includes a square wave generator for squaring the pulsating voltage, and a pulse generator which generates the spike pulse at the leading edge of the square wave.

11. The system of claim 10 wherein said pulse generating circuit includes amplitude adjustment means for selectively adjusting the amplitude of the spike pulse.

12. The system of claim 11 wherein said amplitude adjustment adjusts the response of said controllable device.

13. The system of claim 12 wherein said controllable device is a unijunction transistor.

14. The system of claim 13 wherein said controllable device is a programmable unijunction transistor.

15. A method of timing preselected periods of time for a plurality of events from a source of pulsating voltage, the method including the steps of timing units and tens portions of each period by selecting said tens portion and subsequently selecting said units portion, and synchronizing the completion of a units count with the characteristic of a source voltage.

16. The method of claim 15 further including the step of generating an output spike pulse in response to the sensing of substantially the start of a half wave of the pulsating source.

17. The method of claim 16 wherein the completion of the preselected units count generates a completion pulse, the method further including the step of correlating the completion signal with the output spike pulse.

18. The method of claim 17 further including the step of generating a final output pulse at the coincidence of the completion pulse and the pulse spike occuring after the completion pulse.

* * * * *